United States Patent [19]
Rieth

[11] 3,797,159
[45] Mar. 19, 1974

[54] APPARATUS FOR CONTROL DEPTH FISHING

[76] Inventor: James E. Rieth, 2315 Okemos Dr., S.E., Grand Rapids, Mich. 49506

[22] Filed: Feb. 16, 1971

[21] Appl. No.: 115,297

Related U.S. Application Data

[63] Continuation-in-part of Ser. No. 20,934, March 19, 1970, Pat. No. 3,614,016.

[52] U.S. Cl............................ 43/43.12, 43/43.13
[51] Int. Cl............................................ A01k 95/00
[58] Field of Search............. 43/43.12, 43.13, 43.1, 43/42.74, 44.96, 44.97, 43.11, 42.04, 4, 17.5

[56] References Cited
UNITED STATES PATENTS

| | | | |
|---|---|---|---|
| 2,786,296 | 3/1957 | Loebensteen | 43/43.12 |
| 2,399,371 | 4/1946 | Mendelson | 43/43.1 |
| 2,826,850 | 3/1958 | Laudan | 43/17.5 |
| 2,735,212 | 2/1956 | Baum | 43/43.12 |
| 3,032,912 | 5/1962 | Bengtsson | 43/43.13 |

*Primary Examiner*—Warner H. Camp
*Attorney, Agent, or Firm*—Price, Heneveld, Huizenga & Cooper

[57] ABSTRACT

A reel of large diameter and having a handle is mounted on a base. A steel control line is wound onto the reel. Secured to the end of this line is a heavy weight having a stabilizing fin projecting therefrom. A release or clip line having a clip secured thereto is fastened to an aperture in the stabilizer fin. The clip is fastened to a line having a lure thereon which is actually used for fishing.

9 Claims, 3 Drawing Figures

PATENTED MAR 19 1974 3,797,159
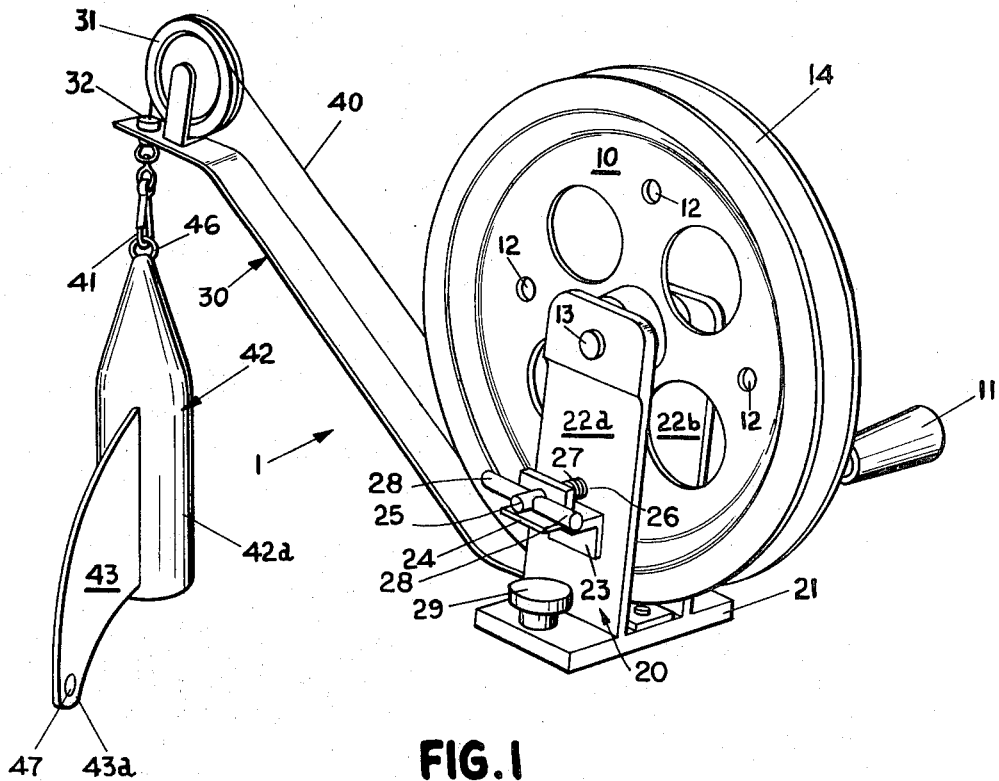
FIG. 1
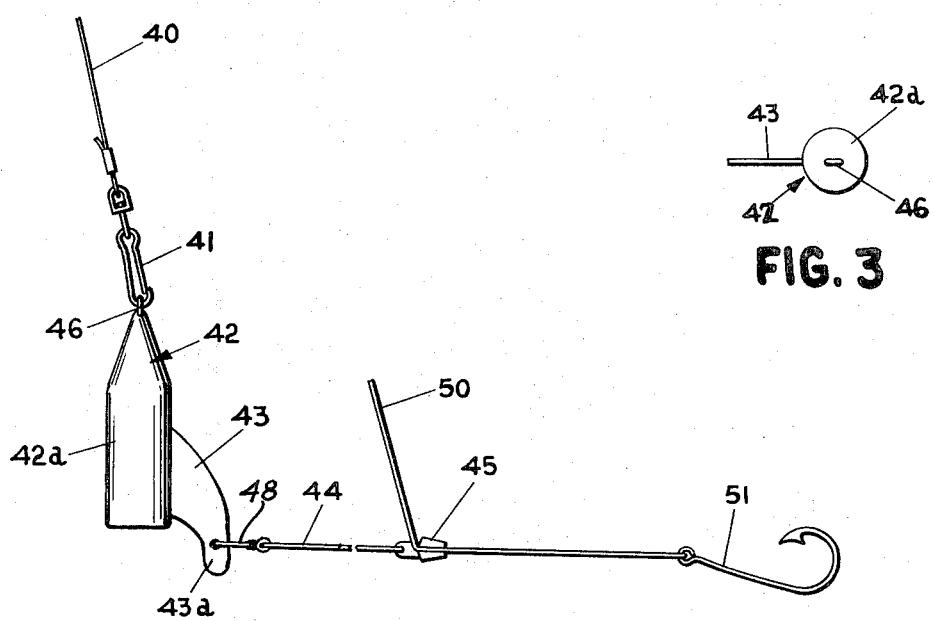
FIG. 2
FIG. 3
INVENTOR.
JAMES E. RIETH
BY Price, Heneveld
Huizenga & Cooper
ATTORNEYS

APPARATUS FOR CONTROL DEPTH FISHING

RELATED APPLICATIONS

This is a continuation in part of U.S. Pat. application, Ser. No. 20,934, filed on Mar. 19, 1970 and now Pat. No. 3,614,016 issued Oct. 19, 1971.

BACKGROUND OF THE INVENTION

It is known that a given type of fish has an affinity for water of a particular temperature. Furthermore, it is known that to a great extent, water stratifies into different temperature layers. Thus, when trolling for fish to be found in water of a particular temperature, it is desirable to keep the trolling lure in a layer of water of that particular temperature.

In order to accomplish this, the desired depth is first determined by using a temperature indicator or simply by trial and error. Then, a heavy weight is secured to a control line. A short release line or clip line is fastened to the control line near the weight and it has a clip at its free end. The trolling line is then clipped to the control line by means of this clip. The lure on the end of the trolling line is allowed to trail 15 to 40 feet feet behind this clip. This rig is then reeled out until the heavy weight reaches the desired trolling depth.

One problem encountered with this type of fishing is that the lure tends to travel erratically through the water and gets tangled with the release line. One might secure the release line directly to the weight, but this would only create even greater problems. The tendency of the weight to rotate would cause the release line to wrap around the weight and become fouled.

SUMMARY OF THE INVENTION

In the present invention, a weight is used which substantially eliminates these fouling problems, even though the release line is secured directly to the weight. The weight includes a heavy body with a stabilizing fin projecting from the body. The fin includes an aperture therein to which the release line can be secured.

Thus, the stabilizing fin causes the weight to flow more smoothly through the water and prevents it from rotating. Accordingly, the release line can be secured directly to the weight, and the need for a special swivel on the control line is eliminated. Not only is tangling minimized but also an economy in equipment is effectuated. The rigging is simplified and cost is reduced.

In the preferred aspects of the invention, the stabilizer fin extends laterally and downwardly from the weight body to further improve stability. By projecting below the bottom of the body, the fin is more fully exposed to the flow of water.

In yet a narrower aspect of the invention, the weight is painted with a bright fluorescent paint. This, it acts to attract fish to the trolling area in addition to serving its function as a weight.

These and other objects and advantages of the invention will be seen and understood by reference to the specification and appended drawings.

BRIEF DESCRIPTION OF THE DRAWINGS

FIG. 1 is a left-side perspective of the reel assembly with the weight attached thereto;

FIG. 2 is a schematic showing a side view of the weight and the line rigging for control depth trolling made possible by the novel weight; and, FIG. 3 is a plan view of the weight.

PREFERRED EMBODIMENT

The reel assembly 1 includes a reel 10 secured to a reel mounting assembly 20, a flexible arm 30 extending upwardly from the base 21 of reel mounting assembly 20 and line 40 wound on reel 10 (FIG. 1). Weight 42 is secured to the end of line 40 by swivel clip 41, and release line 44 is secured to the thin stabilizing fin 43 of weight 40 (FIG. 2). Fin 43 provides stability to weight 42 as it travels through the water.

Weight 42 is cast of lead, or of a similar high-density, inexpensive material. It includes a body portion 42a and a stabilizing fin 43 projecting laterally therefrom (FIGS. 1, 2, and 3). Body portion 42a is long and slender in configuration and is shaped somewhat like a rocket. It has a generally flat bottom, extends cylindrically approximately one-half its height, and then tapers up to a generally pointed nose. Integrally secured to the tapering nose of body 42a is a connector ring 46 to which a swivel clip 41 on the end of line 40 can be secured.

Stabilizing fin 43 projects laterally and downwardly from body 42a of weight 42. Preferably, a portion of stabilizing fin 43 projects below the bottom of body 42a (FIG. 2). That portion of stabilizing fin 43 which extends below the bottom of body 42a is more directly exposed to the flow of water and thereby tends to improve the stabilizing effect of fin 43.

Preferably, weight 42 is between approximately 7 and 10 pounds in weight. Proportionally, fin 43 extends generally from the bottom of body 42a about one-half the distance to the top thereof. Body 42a has a diameter of about one-fifth to one-fourth of its height. Fin 43 extends below body 42a approximately 1/2 the height of body 42a and extends laterally from body 42a about one-half the height of body 42a.

Thus, for a 7 to 10 pound weight, body 42a is approximately 5 inches long and approximately 1 ¼ inches to 1 ½ inches in diameter. Stabilizing fin 43 is approximately 2 inches in height at the point of its junction with body 42a and then tapers downwardly to a width of approximately ¾ of an inch at its rounded tail 43a. Preferably stabilizing fin 43 extends about 2 ¼ inches laterally of body 42a and approximately 2 ¼ inches below the bottom of body 42a.

Stabilizing fin 43 includes an aperture 47 therein and extending therethrough at its tail portion 43a (FIGS. 1 and 2). It is aperture 47 which facilitates the connection of release line 44 to weight 42. Release line 44 includes a swivel clip 48 at one end thereof which is snapped into aperture 47 in stabilizing fin 43 (FIG. 2). Release line 44 is secured to and extends from swivel clip 48 to alligator clip 45. Preferably, the gripping surfaces of the jaws of alligator clip 45 are smooth, as by being coated with plastic, to prevent trolling line 50 from being cut thereon.

While weight 42 does not necessarily have to be painted, it is preferable that it be painted with a bright, fluorescent-type paint. In this manner, weight 42 will act to attract fish to the general area in which the fisherman is trolling. Indeed, it has been found that by coating weight 42 with a red-orange fluorescent paint, a large fish may actually strike at weight 42 before striking at the lure which is secured to the main fishing line 50.

Reel 10 is a cast aluminum wheel of large diameter. The perimeter of reel 10 is channel shaped forming winding channel 14 whose sides slope downwardly towards the center of the channel (FIG. 1). Handle 11 includes an axle portion 13 to which reel 10 is secured by means of a set screw or the like. Extending through reel 10 from one side to the other are four indexing apertures 12, three of which are visible in FIG. 1. These are arranged in a circular fashion and are equidistant from each other on that circle.

Reel mounting 20 comprises a base 21 and a pair of arms 22a and 22b which extend upwardly from base 21 (FIG. 1). There are holes in the top of each arm 22a and 22b so that the axle portion 13 of handle 11 passes through and is carried by arms 22a and 22b. In this manner, reel 10, by being mounted on the axle portion 13 of handle 11 is sturdily mounted between arms 22a and 22b.

Secured to arm 22a is a stop pin mounting bracket 23 (FIG. 1). This extends outwardly from arm 22a and then upwardly, with the upwardly extending portion including a hole through which a stop pin 25 extends. There is a parallel hole through arm 22a such that stop pin 25 extends through and is slidably and rotatably mounted in both the mounting bracket 23 and arm 22a. Pin 25 includes a flange 26 which limits the extent to which pin 25 can be slid through the hole in arm 22a.

The apertures 12 in reel 10 are arranged in a circle whose radius is such that reel 10 can be rotated to a position such that any one of the apertures 12 will be parallel to the hole in arm 22a through which pin 25 extends (FIG. 1). Flange 26 on pin 25 is located such that pin 25 will extend sufficiently far through arm 22a to engage aperture 12 in reel 10. A spring 27 is wrapped around pin 25 and is carried between flange 26 and mounting bracket 23 such that pin 25 is biased towards engagement with apertures 12.

Pin mounting bracket 23 also includes a blocking flange 24 extending horizontally outwardly therefrom as shown in FIG. 1. Pin 25 includes an indexing handle 28 near the end thereof. When pin 25 is moved outwardly against the bias of spring 27 and is rotated so that indexing handle 28 is in a vertical position, indexing handle 28 will engage the blocking surface of flange 24 such that pin 25 cannot be forced into engagement with any aperture 12 by bias spring 27. When pin 25 is rotated 90°, then indexing handle 28 will no longer engage flange 24 and pin 25 will be forced into engagement with aperture 12.

Secured at one end to base 21 and extending upwardly therefrom is flexible arm 30 (FIG. 1). The opposite end of arm 30 is free to move. Arm 30 is preferably made of some type of spring material such that it will flex when a force is applied to the free end thereof. The end of arm 30 which is fixed to base 21 could be itself spring mounted to facilitate such flex, although this is not necessary where arm 30 is made of a flexible material.

Secured to the free end of flexible arm 30 is a pulley 31 (FIG. 1). The free end of arm 30 also includes an eye 32 extending therethrough and being located to the outside of pulley 31, away from reel 10.

A steel control line 40 is wound onto reel 10 in winding channel 14. Preferably, line 40 winds off the bottom of reel 10 and extends upwardly over pulley 31 and through eye 32. A clip 41 is secured to the end thereof.

The line is wound onto reel 10 in a random fashion, except to the extent that it tends to be guided towards the center of reel 10 because of the sloping of the sides of winding channel 14. Weight 42 is then secured to line 40 by swivel clip 41.

Base 21 of mounting assembly 20 includes a pair of bolts 29, each being located to the outside of an arm 22a or 22b (FIG. 1). By means of bolts 29, the entire reel assembly 1 can either be secured directly to a boat by means of bolts 29, or it can be secured to a mounting assembly which in turn is mounted on the boat.

In operation, a trolling line 50 (FIG. 2) is clipped to the end of control line 40 by means of alligator clip 45. Alligator clip 45 is secured to clip line 44 which in turn is secured to a hole in fin 43 of weight 42 which is secured to the end of control line 40 by means of clip 41. The lure 51 of trolling line 50 is generally allowed to trail about 15 to 40 feet behind alligator clip 45.

The desired fishing depth having been previously determined, the control line 40 is now unwound. The diameter of reel 10 is approximately 0.64 feet such that a single revolution of reel 10 will unwind 2 feet of control line 40. The steel line 40 which is used is preferably about 0.025 inches in diameter. Between 200 and 300 feet of line 40 is wound onto reel 10.

The ratio of the length and diameter of line 40 wound on reel 10 to the diameter of reel 10 is such that a given amount of line which unwinds in a given revolution remains relatively fixed regardless of the amount of line which has previously been unwound from reel 10. If the line were too thick and/or too long, then the winding on reel 10 would be bulky and more line would unwind from a full reel than from an empty one. This would also be true if the reel were too narrow in diameter. However, since 0.025 inch line is preferable, a diameter of 0.64 feet for reel 10 is sufficiently large to accommodate 200 to 300 feet of line 40 without generating this measurement problem.

By observing the relationship of handle 11 to arm 22b, one can count the number of revolutions made of reel 10 and can thereby determine the amount of control line 40 which has been unwound. By observing the relationship of indexing apertures 12 to an arm 22a or 22b, one can even determine the number of partial revolutions made and thereby more accurately determine the amount of line 40 unwound. When one achieves the desired depth, one rotates stop pin 25 to the position shown in FIG. 1 and thereby allows spring 27 to force pin 25 into engagement with an aperture 12. This prevents any further rotation of reel 10.

At this point the trolling rig in the water will have generally the appearance shown in FIG. 2. Weight 42 is sufficiently heavy that the angle of control line 40 is minimized in spite of the fact that the boat is moving along at a fair rate of speed. Fin 43 prevents weight 42 from rotating and fouling the rigging. If a fish strikes lure 51, trolling line 50 will pull free of alligator clip 45 and the control line 40 will in no way interfere with the action of the fighting fish on line 50.

If one desires to vary the depth at which he is trolling, one merely pulls pin 25 out of engagement with aperture 12 and rotates it such that indexing handle 28 engages the end surface or blocking surface of blocking flange 24. One can vary the amount of control line 40 which is played out within 6 inches, because there are four apertures 12 disposed equidistant from each other in a circle on the side of reel 10. Thus, since one revolution of reel 10 plays out 2 feet of line 40, then the rotation of reel 10 from one indexing aperture 12 to the next adjacent indexing aperture 12 will vary the amount of line 40 which is out by 6 inches. Thus, apertures 12 serve the function of an extremely accurate indexing means as well as a means for preventing rotation of reel 10. Control of the trolling depth can be extremely accurate.

As trolling proceeds, the control line 40 will encounter many shocks due to the heavy weight 42 being attached thereto. Some of these shocks may occur because weight 42 strikes the bottom of the lake. While such shocks might cause control lines to snap in conventional gear, such shocks will be absorbed in this invention because of the action of flexible arm 30. When a shocking force is applied to line 40, the free end of flexible arm 30 will be free to dip and thereby absorb a good deal of the force which would otherwise act only on line 40. Another shock which may frequently be significant is caused by the action of waves and surface currents against line 40. These two forces are absorbed by the action of flexible arm 30.

The eye 32 in arm 30 allows the lure to be played out at any angle with respect to reel assembly 10 without causing line 40 to jump out of the track of pulley 31. 360° tracking is thus allowed.

Thus, it can be seen that this invention provides a control depth fishing reel with a number of unique advantages over prior art devices. Problems of line tangling with the depth control weight are substantially eliminated due to the improved flow stability achieved with the weight 42. Rigging for securing release line 44 to control line 40 is eliminated by the provision of an aperture 47 in stabilizing fin 43 of weight 42. Finally, the bright color of weight 42 actually aids in attracting fish.

It is understood that the above is merely a preferred embodiment of the invention and that a number of alterations or variations can be made thereof without departing from the spirit and broader aspects of the invention.

I claim:

1. A weight for use in trolling comprising: an elongated body having a generally flat bottom and tapering upwardly to a generally pointed nose; a stabilizing fin projecting laterally and downwardly from said body; said stabilizing fin extending from the bottom of said weight approximately half the distance to the top thereof and downwardly below said bottom a distance approximately one-half the height of said body; and said fin extending laterally of said body approximately one-half the height thereof whereby said fin is exposed to the flow of water past said weight to improve the stability thereof.

2. The weight of claim 1 in which said stabilizing fin is widest at its junction with said body and tapers down to a narrower, rounded tail portion.

3. The weight of claim 1 including means thereon for securing said weight to a depth control line and means on said weight for securing a release line thereto which can be releasably connected to a trolling line.

4. The weight of claim 1 including means at the top of said body securing said weight to a control line; means on said stabilizing fin for securing a release line thereto which can be releasably connected to a trolling line.

5. The weight of claim 4 in which said securing means on said stabilizing fin comprises an aperture therein.

6. The weight of claim 1 in which said weight is painted with a brightly colored, fluorescent paint.

7. A depth control trolling apparatus comprising: a reel; a control line wound on said reel; a weight secured to said reel; said weight having an elongated body having a generally flat bottom and tapering upwardly to a generally pointed nose and a stabilizing fin projecting laterally therefrom; said stabilizing fin curving downwardly away from said body and extending below the bottom thereof whereby said stabilizing fin is exposed to the flow of water past said weight; means on said body for operably securing said control line thereto; means on said stabilizing fin for operably securing a release line thereto; a release line generally secured at one end to said stabilizing fin and having a release clip secured to the other end thereof whereby a trolling line can be releasably secured to said release line and will snap free thereof in the event of a sharp tug on said trolling line.

8. The depth control apparatus of claim 7 in which said stabilizing fin extends from the bottom of said weight approximately half the distance to the top thereof; and downwardly below said bottom a distance approximately one-half the height of said body; and said fin extending laterally of said body approximately one-half the height thereof.

9. The weight of claim 8 in which said weight is painted with a brightly colored, fluorescent paint.

* * * * *